(12) United States Patent
Bogucki et al.

(10) Patent No.: US 11,993,371 B2
(45) Date of Patent: May 28, 2024

(54) THERMAL RELIEF DOORS FOR OVERHEAT PREVENTION OF ANTI-ICE SYSTEMS ON AIRCRAFT

(71) Applicant: The Boeing Company, Chicago, IL (US)

(72) Inventors: Grzegorz G. Bogucki, Everett, WA (US); Matthew J. Osborn, Bellingham, WA (US); Art Ma, Sammamish, WA (US); Saad Dawood, Lynnwood, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/530,233

(22) Filed: Nov. 18, 2021

(65) Prior Publication Data

US 2022/0258850 A1 Aug. 18, 2022

Related U.S. Application Data

(60) Provisional application No. 63/149,547, filed on Feb. 15, 2021.

(51) Int. Cl.
*B64C 3/36* (2006.01)
*B64C 9/14* (2006.01)
*B64D 15/04* (2006.01)
*B64D 29/08* (2006.01)
*B64D 45/00* (2006.01)

(52) U.S. Cl.
CPC ............ *B64C 3/36* (2013.01); *B64C 9/14* (2013.01); *B64D 15/04* (2013.01); *B64D 29/08* (2013.01); *B64D 45/00* (2013.01); *B64C 2009/143* (2013.01)

(58) Field of Classification Search
CPC ........ B64D 15/00; B64D 15/02; B64D 15/04; B64D 2045/0233; B64C 3/36
See application file for complete search history.

(56) References Cited

U.S. PATENT DOCUMENTS

| 4,607,760 | A | * | 8/1986 | Roche | .................. B01J 3/03 105/377.07 |
|---|---|---|---|---|---|
| 4,674,714 | A | * | 6/1987 | Cole | ............... B64D 15/04 138/104 |
| 4,825,644 | A | * | 5/1989 | Bubello | ............ B64D 29/00 60/39.83 |

(Continued)

*Primary Examiner* — Philip J Bonzell
*Assistant Examiner* — Colin Zohoori
(74) *Attorney, Agent, or Firm* — Hanley, Flight & Zimmerman, LLC

(57) ABSTRACT

Methods, apparatus, systems and articles of manufacture are disclosed for overheat prevention of anti-ice systems for aircraft. An example aircraft includes a wing, a slat movably coupled to the wing, the slat having a compartment to receive heated bleed air, the slat including a panel, an opening formed in the panel, a door in the opening of the panel of the slat, an edge of the door hingeably coupled to the panel, the door movable between a closed position and an open position, and a latch coupled to the panel, the latch to hold the door in the closed position, the latch constructed of a thermally sensitive material such that when a temperature inside of the compartment reaches a threshold temperature, the latch releases the door to enable the door to move to the open position to vent the heated bleed air from the compartment.

19 Claims, 9 Drawing Sheets

(56) References Cited

U.S. PATENT DOCUMENTS

| | | | |
|---|---|---|---|
| 8,991,191 B2* | 3/2015 | Diaz | F02K 1/822 |
| | | | 60/785 |
| 2007/0084969 A1* | 4/2007 | Ellstrom | F02C 7/047 |
| | | | 244/135 R |
| 2012/0187254 A1* | 7/2012 | Wollaston | B64C 9/22 |
| | | | 244/214 |
| 2017/0190440 A1* | 7/2017 | McLaughlin | B64D 39/06 |
| 2017/0305562 A1* | 10/2017 | Chengalva | B64C 1/20 |
| 2019/0195128 A1* | 6/2019 | Diaz | F02C 7/18 |
| 2020/0025072 A1* | 1/2020 | Mackin | F01D 17/105 |

\* cited by examiner

THERMAL RELIEF DOORS FOR OVERHEAT PREVENTION OF ANTI-ICE SYSTEMS ON AIRCRAFT

RELATED APPLICATION

This patent claims the benefit under 35 U.S.C. § 119(e) to U.S. Provisional Application No. 63/149,547, titled "Thermal Relief Doors for Overheat Prevention of Anti-Ice Systems on Aircraft," filed Feb. 15, 2021, which is hereby incorporated by this reference in its entirety.

FIELD OF THE DISCLOSURE

This disclosure relates generally to aircraft and, more particularly, to thermal relief doors for overheat prevention of anti-ice systems on aircraft.

BACKGROUND

During operation, an aircraft may be exposed to atmospheric temperatures that may cause formation of ice on one or more surfaces of the aircraft. Aircraft commonly implement anti-ice systems to prevent the formation of ice on certain surfaces, such as the leading edges of wings and/or the engine inlet cowls of the aircraft. Some anti-ice systems direct heated bleed air from an engine of the aircraft to the leading edges of the wings and/or engine inlet cowls while the aircraft is in flight. The heated bleed air raises a temperature of the leading edges and/or engine inlet cowls to prevent the formation of ice thereon. The anti-ice systems can be shut off while the aircraft is grounded to prevent overheating of one or more components of the aircraft.

SUMMARY

An example aircraft disclosed herein includes a wing and a slat movably coupled to the wing. The slat has a compartment to receive heated bleed air. The slat includes a panel, an opening formed in the panel, and a door in the opening of the panel of the slat. An edge of the door is hingeably coupled to the panel. The door is movable between a closed position and an open position. A latch is coupled to the panel, the latch to hold the door in the closed position. The latch is constructed of a thermally sensitive material such that when a temperature inside of the compartment reaches a threshold temperature, the latch releases the door to enable the door to move to the open position to vent the heated bleed air from the compartment.

An example method of installing a thermal relief door on an aircraft disclosed herein includes hingeably coupling an edge of a door to a panel at or near an opening in the panel such that the door is movable between a closed position and an open position. The panel at least partially defines a compartment. The compartment is to receive heated air. The method also includes coupling a latch to the panel and engaging the latch with the door to hold the door in the closed position. The latch is constructed of a thermally sensitive material such that when a temperature inside of the compartment reaches a threshold temperature, the latch releases the door to enable the door to move to the open position to vent the heated air from the compartment.

An example system for controlling temperature in a closed compartment disclosed herein includes a panel having an opening. The panel at least partially defines the closed compartment. The closed compartment is to receive heated air. The system also includes a door in the opening of the panel. An edge of the door is rotatably coupled to the panel at a hinge. The door is rotatable between a closed position in which the door covers the opening and an open position in which the door uncovers the opening. The system also includes a torsion spring coupled between the edge of the door and the panel. The torsion spring is to bias the door to the closed position. The torsion spring is constructed from a thermally sensitive material. The torsion spring is to reduce stiffness when a temperature inside of the closed compartment reaches a threshold temperature to enable the door to rotate to the open position to vent the heated air from the closed compartment.

Figure 1:
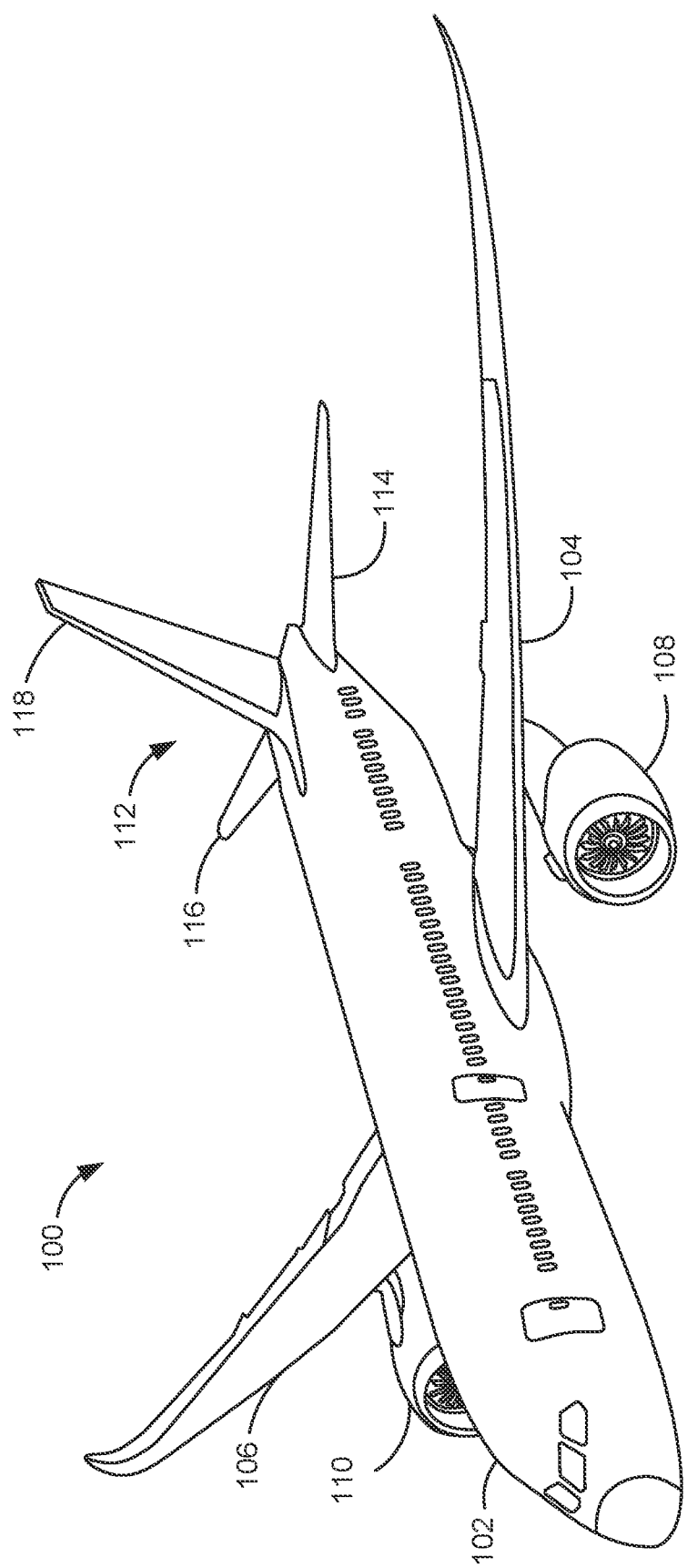
FIG. 1 illustrates an example aircraft on which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

During flight, such as when flying at high altitudes (e.g., above 35,000 feet), aircraft commonly operate in relatively cold atmospheric conditions that may cause formation of ice on the aircraft. Additionally, ice may form on the aircraft when the aircraft is flying at altitudes closer to the ground (or while the aircraft is on the ground), and atmospheric temperatures are at or below freezing. In some cases, ice can form on leading edges of wings, engine inlet cowls, and/or other surfaces of the aircraft. The ice may cause damage to and/or reduce functionality of the wings and/or the engines. Accordingly, some aircraft implement anti-ice systems (e.g., bleed air anti-ice systems, pneumatic anti-ice systems) to reduce and/or prevent the formation of ice on certain surfaces of the aircraft. Some anti-ice systems direct heated bleed air from one or more engines of the aircraft to a compartment within the leading edges, where the heated bleed air raises a temperature of the leading edge surfaces to prevent formation of ice thereon. However, excessive temperatures proximate the leading edges may also cause damage to one or more components of the aircraft. As such, the anti-ice systems are typically shut off while the aircraft is grounded to prevent damage due to overheating of the one or more components.

Some existing anti-ice systems employ one or more temperature sensors, pressure sensors, valves, and/or controllers to control a flow of the bleed air to the wings and/or to the engine inlet cowls of the aircraft. In some cases, the anti-ice systems are configured to allow the flow of heat bleed air to the wings and/or the engine inlet cowls during operation (e.g., flight, forward propulsion) of the aircraft, and prevent the flow of bleed air while the aircraft is grounded and/or stationary. In some such cases, the pressure sensors of the anti-ice system measure a pressure (e.g., weight) on wheels of the aircraft, and can send a signal corresponding to the measured pressure to a data bus coupled to the controller. The controller can determine that the aircraft is grounded in response to the measured pressure exceeding a pressure threshold. In response to determining that the aircraft is grounded, the controller can close the valves to prevent further flow of bleed air. Additionally, the controller can reopen the valves in response to determining that the aircraft is in flight (e.g., based on the measured pressure being less than the pressure threshold). Further, the controller can open or close the valves based on temperatures measured at or along the leading edges by the temperature sensors. Accordingly, the anti-ice system can prevent overheating by shutting off the flow of bleed air in response to the measured temperatures exceeding a temperature threshold.

However, in some instances, one or more of the pressure sensors, the temperature sensors, the controller, or the valves may fail and/or otherwise malfunction. In such cases, the anti-ice system may continue to provide heated bleed air to the leading edges and/or inlet cowls while the aircraft is grounded, thus causing overheating and subsequent damage of these components of the aircraft. Some known anti-ice systems implement additional (e.g., redundant) valves to control and/or prevent the flow of bleed air in such cases, but these additional valves may result in an undesired increase in weight and/or cost of the aircraft. Alternatively, the leading edges of the aircraft can be manufactured using stronger and/or more heat-resistant materials, but such materials can also increase the weight and/or cost of the aircraft. Another alternate solution involves implementing additional sensors (e.g., pressure sensors and/or temperature sensors) that can alert a pilot of the aircraft and/or prevent takeoff of the aircraft in response to detecting that overheating has occurred. However, these additional sensors may increase complexity of the anti-ice system and require additional input by the pilot to correct the overheating conditions.

Disclosed herein are example anti-ice systems that include thermal relief doors to prevent overheating of the anti-ice components and, thus, prevent potential damage or adverse effects to the components of the aircraft from overheating. The example thermal relief doors disclosed herein can passively open to vent excessively hot air from a compartment to the atmosphere. An example thermal relief door disclosed herein is movably (e.g., hingeably) coupled to a panel that forms at least a portion of a compartment that receives heated bleed air. For example, the thermal relief door can be implemented on a leading edge slat of the aircraft. In another example, the thermal relief door can be implemented on an engine inlet cowl of the aircraft. The example thermal relief door is disposed in or otherwise covers an opening formed in the panel. The thermal relief door is movable between a closed position and an open position. In the closed position, the thermal relief door covers or blocks the opening (to prevent air from moving through the opening). In the open position, the thermal relief door is moved away from or otherwise uncovers the opening to enable the heated bleed air in the compartment to vent to atmosphere, thereby reducing the temperature inside the compartment to prevent overheating.

The example thermal relief door can be coupled to the panel via a hinge. The door can rotate about the hinge to move between the closed and open positions. In some examples, a torsion spring is coupled between the door and the panel. The torsion spring biases the door to the closed position. In some examples, a latch is coupled to the panel and holds the door in the closed position. The torsion spring and the latch are constructed of thermally sensitive material that yields or loses stiffness above a threshold temperature. Under normal operating conditions of the anti-ice system, the air inside the compartment remains below a threshold temperature. In such conditions, the torsion spring and the latch maintain their structural rigidity and hold the thermal relief door closed to prevent the heated bleed air from escaping via the opening. However, if a component (e.g., a valve, a sensor, etc.) of the anti-ice system fails while the aircraft is on the ground and continues to provide heated bleed air into the compartment, the temperature in the compartment may rise above the threshold temperature. If the temperature inside the compartment reaches or exceeds the threshold temperature, the torsion spring and the latch lose rigidity or stiffness, which allows the thermal relief door to open. As a result, the heated bleed air from the compartment can escape to the atmosphere via the opening, thereby preventing the compartment from overheating.

In some examples, the inside of the door has a visual indicator, such as brightly colored paint or a warning label. When the door is in the open position, this visual indicator is visible and can be easily noticed by the ground crew. This can serve as an indicator that a potential malfunction occurred in one or more components of the anti-ice system. The ground crew can then take appropriate measures to remedy the malfunction. In some examples, the visual indicator includes at least one of a bright color, a pattern, a written warning, or instructions.

Should the aircraft takeoff and fly after the door is opened, airflow against the door may cause the door to return to the closed position. As such, the thermal relief door allows the anti-ice system to heat the leading edges and prevent formation of ice while the aircraft is in flight, and can prevent overheating of the leading edges while the aircraft is stationary and/or grounded. Advantageously, the example thermal relief door disclosed herein can reduce damage caused by overheating without implementation of additional sensors and/or valves as seen in known anti-ice systems.

FIG. 1 illustrates an example aircraft 100 in which the examples disclosed herein may be implemented. In the illustrated example of FIG. 1, the aircraft 100 includes a fuselage 102, a first wing 104 coupled to the fuselage 102, and a second wing 106 coupled to the fuselage 102. The aircraft 100 also includes a first engine 108 carried by the first wing 104 and a second engine 110 carried by the second wing 106. In other examples, the aircraft 100 may include more or fewer engines and/or the engines may be coupled to other structures of the aircraft 100 (e.g., to a tail section of the aircraft 100). In the illustrated example, the first and second engines 108, 110 are implemented as turbo-fan engines. However, in other examples the first and second engines 108, 110 can be implemented as other types of engines (e.g., turbo-prop engines, turbojets, etc.). The aircraft 100 also includes an empennage 112 (sometimes referred to as a tail assembly) at a rear end of the aircraft 100. The empennage 112 includes horizontal stabilizers 114, 116 and a vertical stabilizer 118. The horizontal stabilizers 114, 116 may have movable elevator flaps, and the vertical stabilizer 118 may have a movable rudder.

Figure 2:
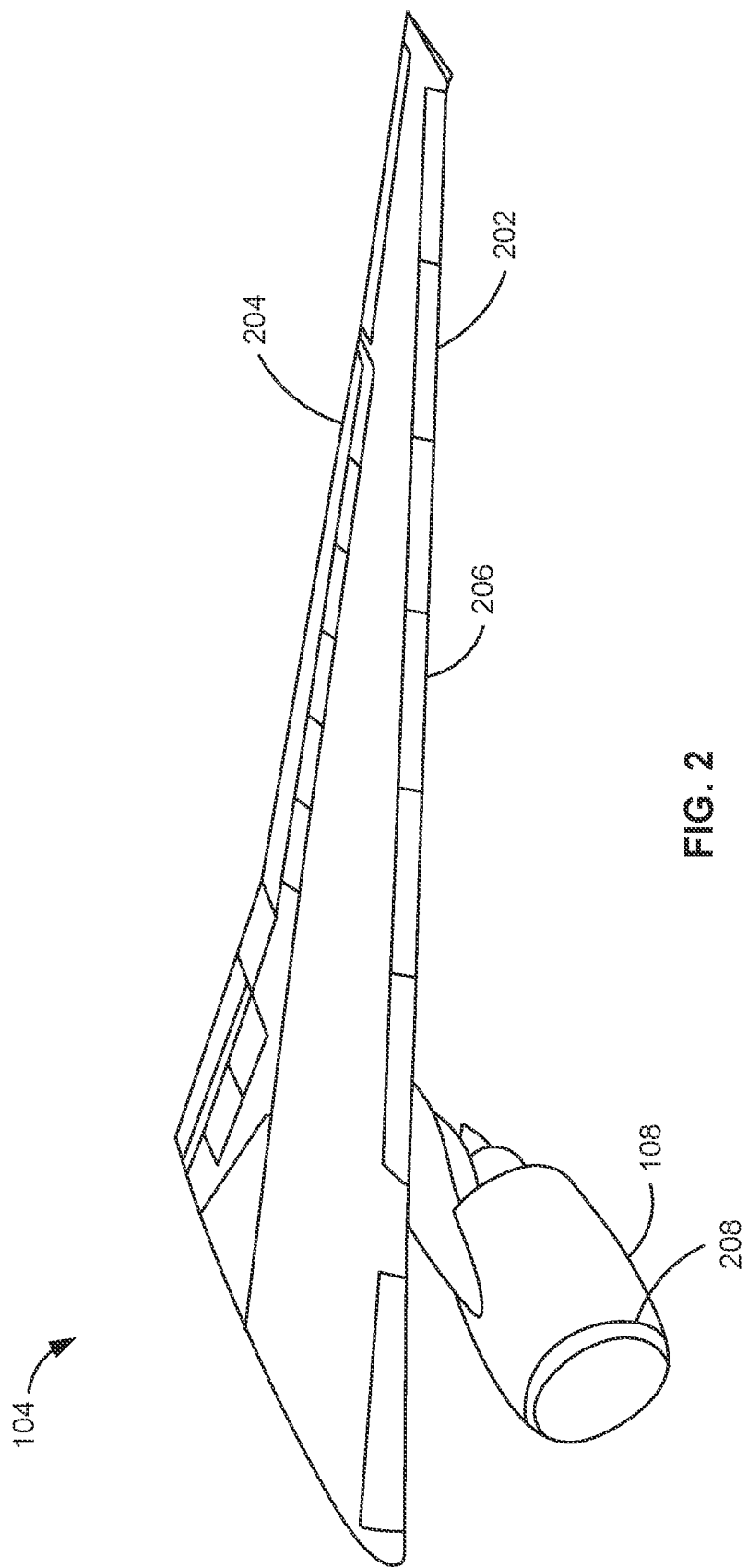
FIG. 2 illustrates an example wing of the example aircraft of FIG. 1.

FIG. 2 is an enlarged view of the first wing 104 of the example aircraft 100 of FIG. 1. The second wing 106 is substantially the same as the first wing 104. Thus, any of the examples disclosed in connection with the first wing 104 can likewise apply to the second wing 106. The first wing 104 has a leading edge 202 and a trailing edge 204 opposite the leading edge 202. The first wing 104 includes leading edge slats 206 (one of which is referenced in FIG. 2) that form at least a portion of the leading edge 202. The leading edge slats 206 can be actuated to move relative to a fixed section of the first wing 104 and affect the airflow over the first wing 104. The first engine 108 is coupled to an underside of the first wing 104. The first engine 108 has an inlet cowl 208.

During forward motion of the aircraft 100, air passes across the first engine 108 and/or across a surface of the first wing 104 from the leading edge 202 to the trailing edge 204. In some examples, such as while the aircraft 100 is at high altitudes, a temperature of the air surrounding the aircraft 100 is extremely low (e.g., −40 degrees)(° Fahrenheit). Additionally, atmospheric temperatures may be low (e.g., at or below freezing temperature) when the aircraft 100 is at altitudes closer to the ground (or while the aircraft is on the ground). Such atmospheric temperatures can result in the formation of ice along the leading edge 202 and/or the inlet cowl 208. The formation of ice can cause damage to and/or disrupt the functionality of the first wing 104 and/or the first engine 108. As such, the aircraft 100 can implement one or more anti-ice systems to reduce or prevent the formation of ice on one or more surfaces of the aircraft 100. In some examples, the anti-ice system can be a bleed air system that directs heated bleed air from an engine of the aircraft 100 (e.g., the first and/or second engines 108, 110) into compartments in the leading edge 202 (e.g., in one or more of the leading edge slats 206) and/or the inlet cowl 208.

Figure 3B:
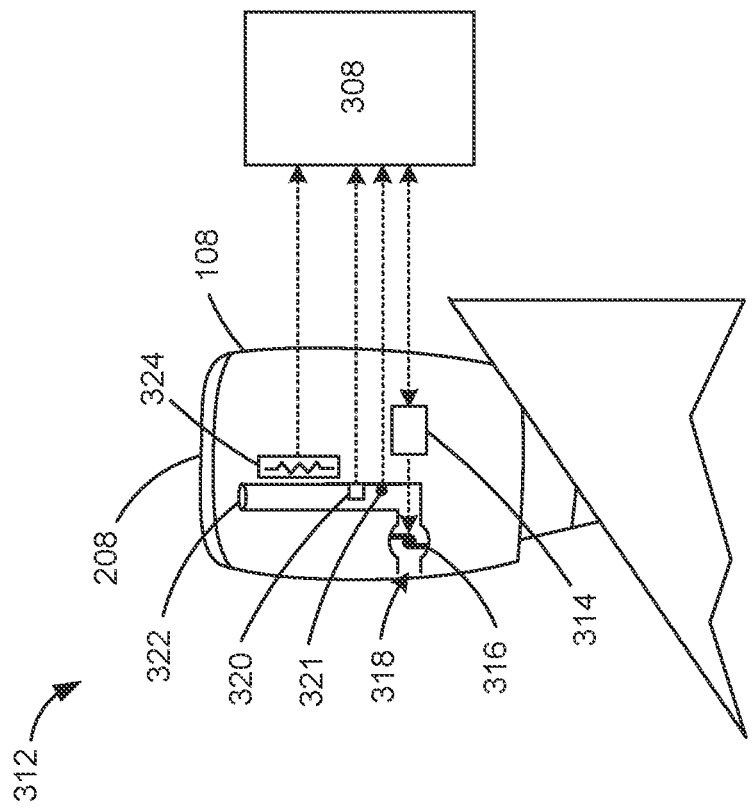
FIG. 3B is a schematic of an example engine anti-ice system implemented in connection with one of the engines of the example aircraft of FIG. 1.
Figure 3A:
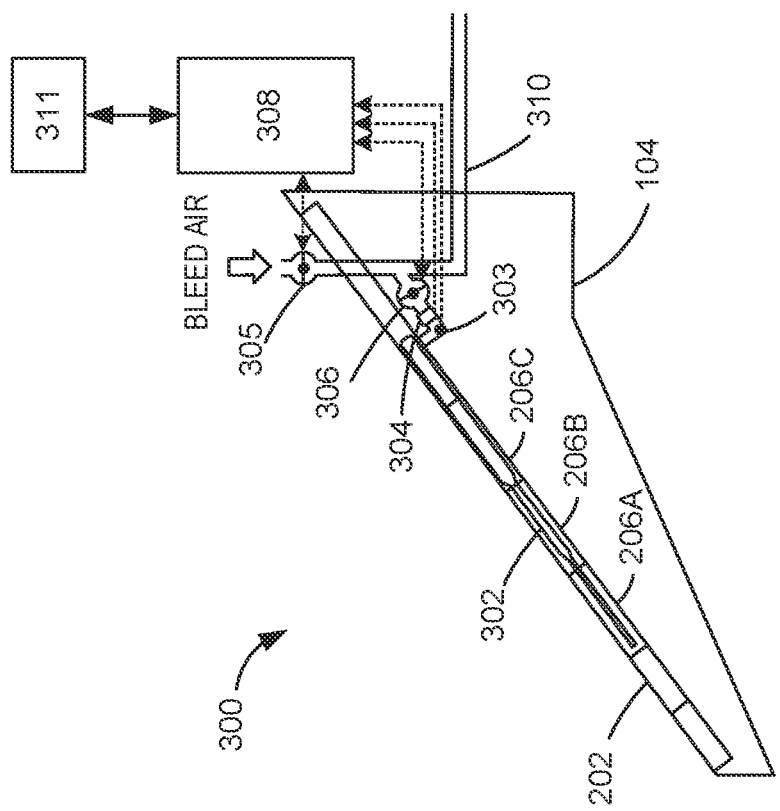
FIG. 3A is a schematic of an example wing anti-ice system implemented in connection with the example wing of FIG. 2 of the example aircraft of FIG. 1.

FIG. 3A is a schematic of an example wing anti-ice (WAI) system 300 implemented on the first wing 104 of FIGS. 1 and 2. The WAI system 300 is configured to heat and/or otherwise prevent formation of ice on three of the leading edge slats 206A-206C located centrally along the leading edge 202 of the first wing 104. In other examples, the WAI system 300 can be configured to heat and/or prevent the formation of ice on any number of the leading edge slats 206. In the illustrated example of FIG. 3A, the WAI system 300 includes an example spray tube 302, an example temperature sensor 303, an example pressure sensor 304, an example first valve 305, an example second valve 306, an example controller 308 (e.g., a processor, a control card, etc.), and example piping 310 (e.g., ducts). In this example, the spray tube 302 extends through and/or is otherwise formed in the three central slats 206A-206C. The controller 308 controls the first and second valves 305, 306, as disclosed in further detail below, to control the amount of heated bleed air directed into the leading edge slats 206A-206C.

In the illustrated example of FIG. 3A, heated bleed air from an engine of the aircraft 100 enters the piping 310. The heated bleed air may be provided by the first engine 108 and/or the second engine 110, for example. When the aircraft 100 is in flight, the controller 308 opens the first and second valves 305, 306. The heated bleed air flows through the first and second valves 305, 306 and into the spray tube 302. The spray tube 302 ejects the heated bleed air into one or more compartments inside each of the leading edge slats 206 to increase a temperature of the leading edge slats 206 and, thus, prevent the formation of ice thereon.

The controller 308 monitors the pressure and temperature of the heated bleed air from the temperature and pressure sensors 303, 304, respectively. In the illustrated example, the temperature and pressure sensors 303, 304 are coupled to the piping 310 downstream from the second valve 306. In this example, the pressure sensor 304 is configured to measure a pressure of the heated bleed air entering the spray tube 302. The pressure sensor 304 is communicatively and/or electrically coupled to the controller 308 to send pressure measurements to the controller 308 via one or more electrical signals. In some examples, the pressure sensor 304 is configured to send the pressure measurements periodically (e.g., at regular time intervals) to the controller 308. Additionally or alternatively, the pressure sensor 304 can be configured to send a signal to the controller 308 in response to the measured pressure exceeding a pressure threshold. Similarly, the temperature sensor 303 is communicatively and/or electrically coupled to the controller 308 to send temperature measurements to the controller 308 via one or more electrical signals.

In response to receiving the pressure and/or temperature measurements, the controller 308 can determine whether the heated bleed air is at a critical pressure and/or temperature by comparing the pressure and/or temperature measurements to the respective thresholds. For example, the controller 308 can determine that the heated bleed air is at a critical temperature in response to determining that the temperature measurements exceed the temperature threshold (e.g., 400 degrees Fahrenheit). In some examples, the controller 308 can determine that the heated bleed air is at a critical pressure in response to determining that the pressure measurements exceed the pressure threshold. In response to the controller 308 determining that the bleed air at the spray tube 302 is at or above a critical temperature and/or pressure, the controller 308 can send a first control signal to the second valve 306 communicatively coupled to the controller 308. In some examples, the second valve 306 closes in response to receiving the first control signal, thereby preventing flow of the bleed air to the spray tube 302. Additionally or alternatively, in response to the controller 308 determining that the bleed air is below the critical temperature and/or pressure, the controller 308 can send a second control signal to the second valve 306 to open the second valve 306 and allow the bleed air to flow therein. As such, the controller 308 can open or close the second valve 306 (or operate the second valve 306 between an open and closed position) to regulate the temperature and pressure of the heated bleed air provided to the leading edge slats 206A-206C.

In some examples, the controller 308 receives measurements from a wheel-weight sensor 311 to detect a landing and/or whether the aircraft 100 is on the ground. For example, the measured weight increases while the aircraft 100 is landing and/or grounded, and the measured weight is reduced while the aircraft 100 is in flight. In some examples, the wheel-weight sensor 311 sends one or more electrical signals to the controller 308 to indicate the measured weight on the one or more wheels. In such examples, the controller 308 determines whether the aircraft 100 is grounded based on the measured weight. For example, the controller 308 can determine that the aircraft 100 is grounded in response to the measured weight being at or above a threshold weight (e.g., 5 pounds per square inch gauge (psig)). In response to determining that the aircraft 100 is grounded, the controller 308 can send control signals to close the first and/or second valves 305, 306, thereby shutting off heated bleed air to the leading edge slats 206A-206C to prevent overheating. Alternatively, in response to determining that the aircraft 100 is not grounded (e.g., based on the measured weight being below the threshold weight), the controller 308 can send control signals to open the first and/or second valves 305, 306, thus allowing the heated bleed air to enter the spray tube 302 and heat the leading edge slats 206A-206C.

While the WAI system 300 is disclosed in connection with the first wing 104, it is understood that a similar anti-ice system can be similarly implemented in connection with the second wing 106. Further, the same anti-ice system or another anti-ice system can be similarly implemented in connection with other leading edge surfaces of the aircraft 100. For example, an anti-ice system (e.g., a bleed air anti-ice system) can be implemented in connection with the leading edges of the horizontal stabilizers 114, 116 (FIG. 1) and the vertical stabilizer 118 (FIG. 1). The anti-ice system similarly provides heated bleed air into the leading edges of the horizontal stabilizers 114, 116 and the vertical stabilizer 118 to reduce or prevent ice formation along on these leading edge surfaces of the empennage 112 (FIG. 1).

FIG. 3B illustrates an example engine anti-ice (EAI) system 312 implemented on the first engine 108 of FIGS. 1 and 2. In the illustrated example of FIG. 3B, the EAI system 312 includes an example valve controller 314 communicatively coupled to the controller 308 of FIG. 3A, an example EAI valve 316, an example bleed port 318 (e.g., high stage bleed port), an example EAI pressure sensor 320, an example EAI temperature sensor 321, an example nozzle 322, and an example duct leak detector 324 communicatively coupled to the controller 308. In this example, heated bleed air from an engine of the aircraft 100 (e.g., the first engine 108 and/or the second engine 110) enters via the bleed port 318 and flows through the EAI valve 316 and the nozzle 322 towards the inlet cowl 208.

Similar to the temperature and pressure sensors 303, 304 of FIG. 3A, The EAI pressure and temperature sensors 320, 321 are configured to measure pressure and temperature of the heated bleed air fluid entering the EAI system 312. In this example, the heated bleed air enters the EAI system 312 via the bleed port 318 and is injected into a compartment in the inlet cowl 208. The controller 308 can determine whether the heated bleed air in the nozzle 322 is at a critical pressure and/or temperature by comparing the pressure and/or temperature measurements to the respective thresholds. For example, the controller 308 can determine that the heated bleed air is at a critical temperature in response to determining that the measured temperature exceeds the temperature threshold (e.g., 400 degrees Fahrenheit). In some examples, the controller 308 can determine that the heated bleed air is at a critical pressure in response to determining that the measured pressure exceeds the pressure threshold. In response to the controller 308 determining that the heated bleed air at the nozzle 322 is at or above a critical temperature and/or pressure, the controller 308 can send a third control signal to the valve controller 314. In some examples, the valve controller 314 closes the EAI valve 316 in response to receiving the third control signal, thereby preventing flow of the heated bleed air to the compartment of the inlet cowl 208. Alternatively, in response to the controller 308 determining that the heated bleed air is below the critical temperature and/or pressure, the controller 308 can send a fourth control signal to the valve controller 314 to open the EAI valve 316 and allow the heated bleed air to flow through the nozzle 322 and toward the compartment of the inlet cowl 208. In such examples, the heated bleed air from the nozzle 322 can be used to heat and/or prevent formation of ice on the inlet cowl 208. Furthermore, in some examples, the duct leak detector 324 is configured to detect whether a leak of heated bleed air from the nozzle 322 has occurred. In such examples, the duct leak detector 324 can send a fifth signal to the controller 308 to indicate that the leak has occurred. In response to determining that the leak has occurred, the controller 308 can direct the valve controller 314 to close the EAI valve 316 and prevent further leakage of the heated bleed air in the EAI system 312.

Figure 4:
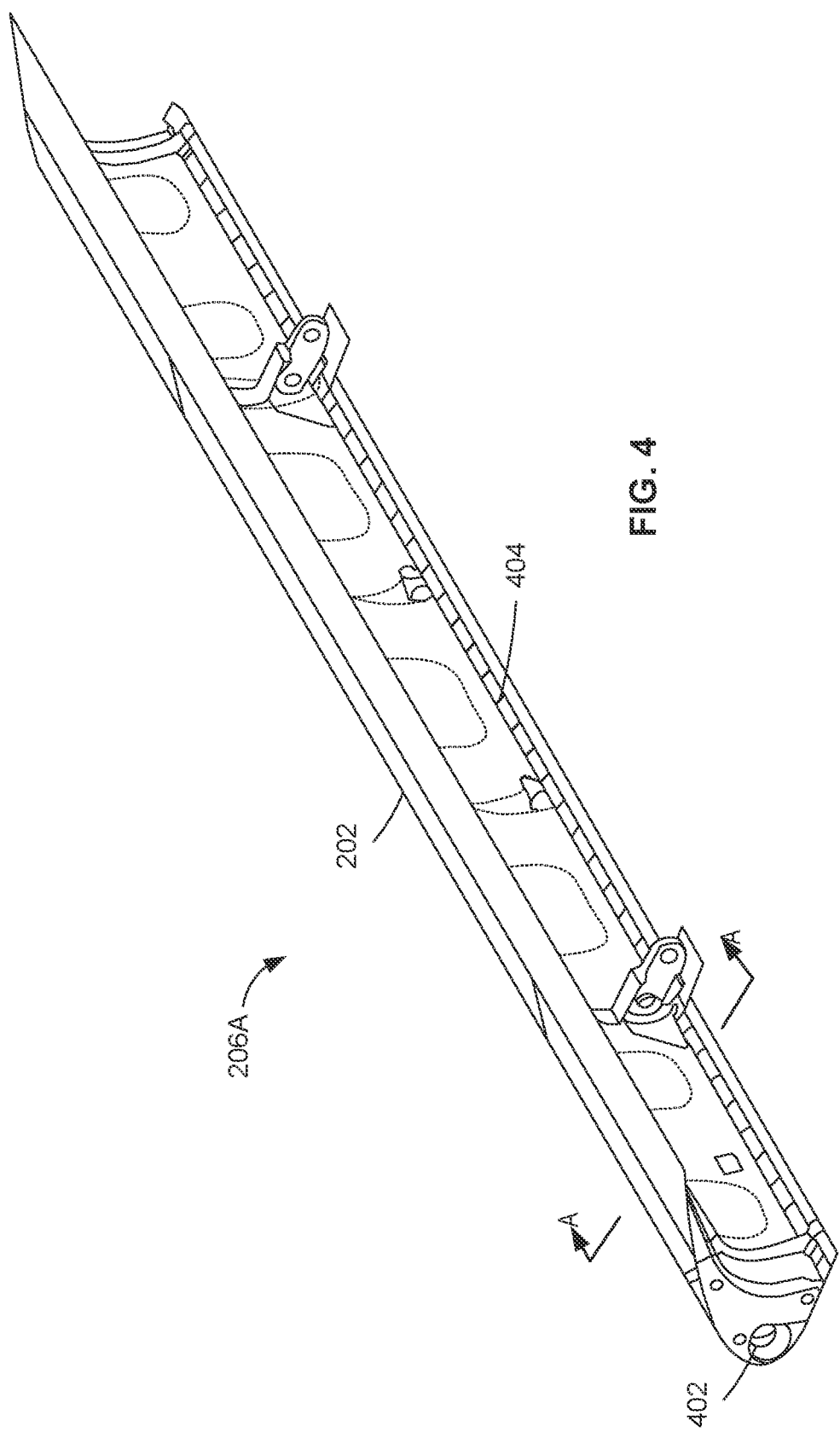
FIG. 4 is a rear perspective view of an example leading edge slat of the example wing of FIG. 2.

FIG. 4 is a rear perspective view of one of the leading edge slats 206A of FIGS. 2 and 3A. The other leading edge slats 206B, 206C are substantially the same. Thus, any of the examples disclosed in connection with the leading edge slat 206A can likewise apply to the other leading edge slats 206. The WAI system 300 of FIG. 3A can be used to direct heated bleed air into the leading edge slat 206A (e.g., into one or more compartments defined in the leading edge slat 206A) to prevent formation of ice on the leading edge 202. The leading edge slat 206A includes an example inlet 402 into which bleed air can enter. For example, the bleed air can enter the inlet 402 via the spray tube 302 of FIG. 3A and circulate through one or more compartments of the leading edge slat 206A. The bleed air can raise a temperature in the one or more compartments of the leading edge slat 206A, then exits the leading edge slat 206A via one or more example exhaust holes 404 (one of which is reference in FIG. 4) along the rear of the leading edge slat 206A. In some examples, the exhaust holes 404 are rectangular and have a width of approximately 1 inch. In other examples, the exhaust holes 404 can be a different shape (e.g., circular, oblong, etc.) or size (e.g., 0.5 inch, 2 inches, etc.).

Figure 5:
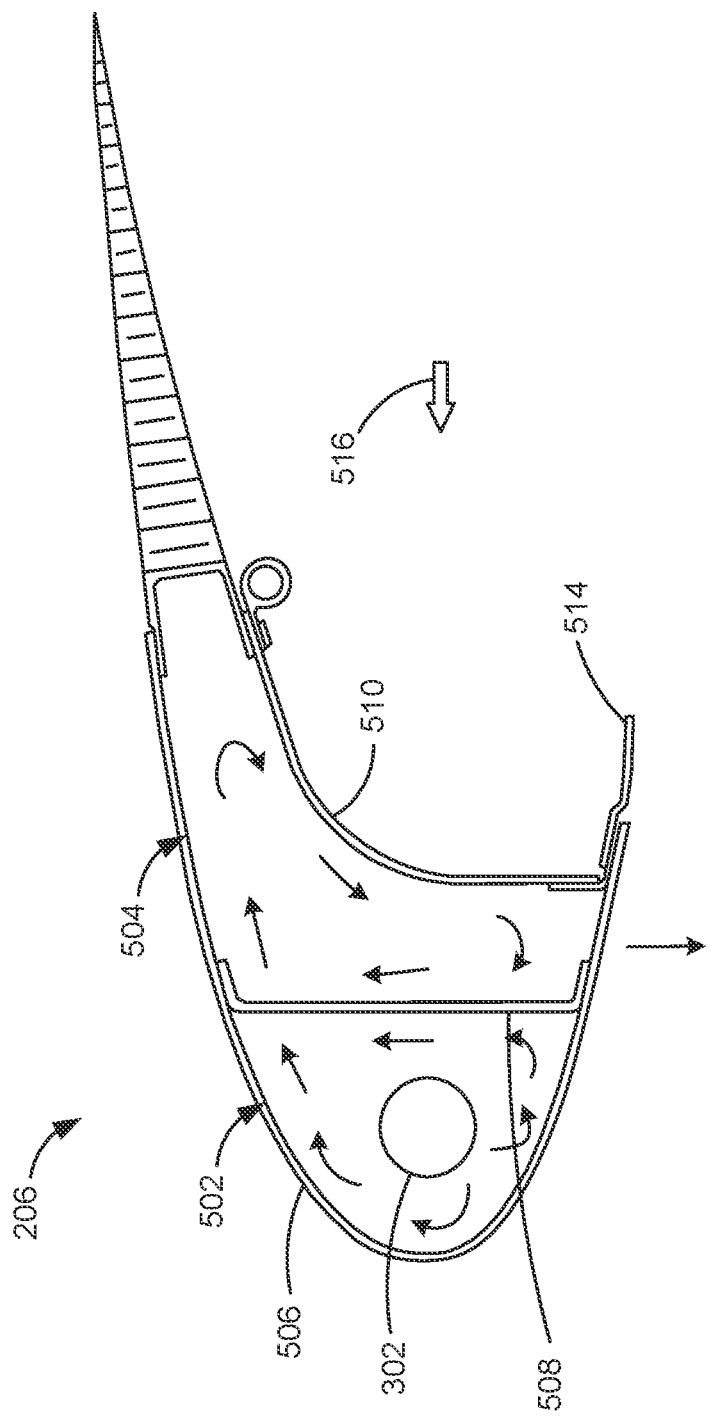
FIG. 5 is a cross-sectional view of the example leading edge slat of FIG. 4 taken along line A-A of FIG. 4.

FIG. 5 is a cross-sectional view of the leading edge slat 206A of FIG. 4 taken along line A-A. In the illustrated example of FIG. 5, the leading edge slat 206A includes an example first compartment 502 (e.g. chamber, nose chamber, closed compartment) and an example second compartment 504. The first compartment 502 is defined by a portion of a panel 506 (e.g., an outer skin, a leading edge panel, a nose panel) and an example nose beam 508. The second compartment 504 is defined by a portion of the panel 506, the nose beam 508, and an example cove skin 510. The spray tube 302 is disposed within the first compartment 502, and an example skirt panel 514 is coupled to a bottom end of the panel 506. Therefore, the leading edge slat 206A, including the first and second compartments 502, 504, form part of the WAI system 300.

In the illustrated example of FIG. 5, the aircraft 100 of FIG. 1 is moving in an example forward direction 516 such that ambient air moves across the leading edge slat 206A in direction opposite the forward direction 516. In some examples, the ambient air moving across the leading edge slat 206A can induce formation of ice on the panel 506. In this example, the WAI system 300 of FIG. 3A is configured to direct heated bleed air into the spray tube 302 via the inlet 402 of FIG. 4. In such examples, the heated bleed air has a relatively high temperature compared to the ambient air. As the heated bleed air flows through the spray tube 302, the heated bleed air can pass through openings disposed around a circumference of the spray tube 302 to enter and circulate within the first compartment 502. Circulation of the heated bleed air throughout the first compartment 502 raises a temperature inside the first compartment 502 and, as such, can raise a temperature on a surface of the panel 506 to prevent formation of ice thereon.

In this example, the heated bleed air in the first compartment 502 can pass through one or more gaps of the nose beam 508 to enter the second compartment 504. The heated bleed air can similarly circulate within the second compartment 504 to raise the temperature inside the second compartment 504 and/or on the surface of the panel 506. The heated bleed air can exit the second compartment 504 via one or more exhaust holes (e.g., the exhaust holes 404 of FIG. 4) in the panel 506 and/or in the cove skin 510. As such, the WAI system 300 can continuously direct heated bleed air to the first and second compartments 502, 504 while the aircraft 100 is in flight to reduce and/or prevent the formation of ice on the panel 506. In some examples, malfunction of the WAI system 300 can cause the WAI system 300 to continue directing heated bleed air into the first and second compartments 502, 504 while the aircraft 100 is grounded and/or while the temperature in the first and second compartments 502, 504 has reached a critical temperature (e.g., 400 degrees Fahrenheit). In such examples, uncontrolled circulation of heated bleed air within the first and second compartments 502, 504 may result in damage of one or more components of the leading edge slat 206A.

Figure 6B:
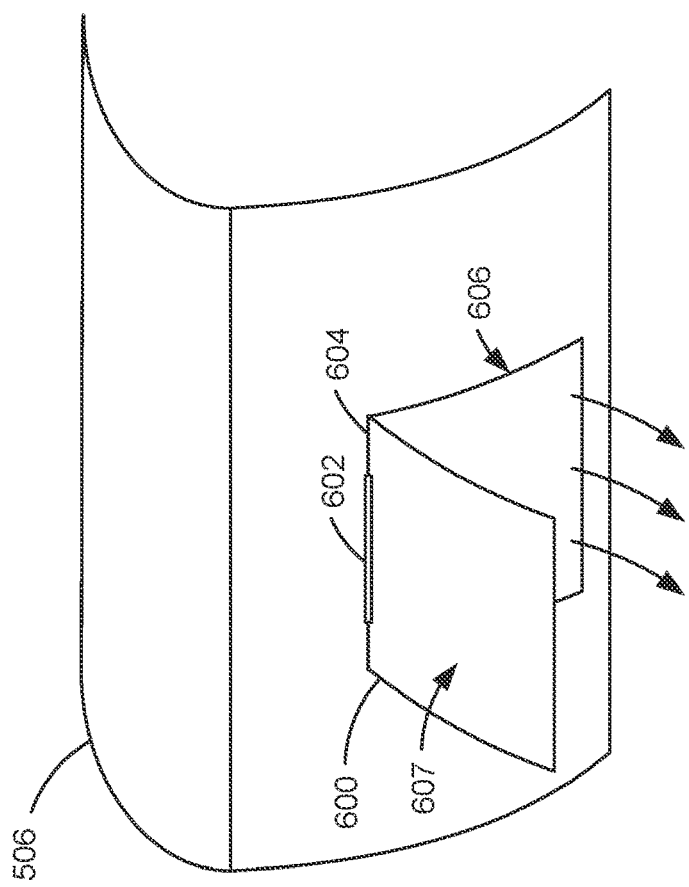
FIG. 6B is a front perspective view of the example leading edge slat of FIG. 4 showing the example thermal relief door in an open position.
Figure 6A:
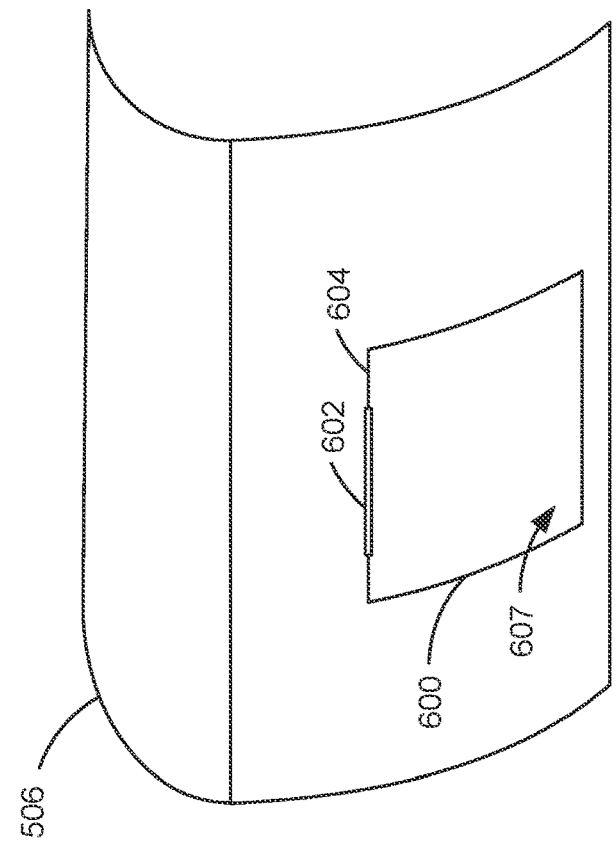
FIG. 6A is a front perspective view of the example leading edge slat of FIG. 4 showing an example thermal relief door in a closed position.

FIGS. 6A and 6B are front perspective views of the panel 506 of the leading edge slat 206A of FIG. 5 having an example thermal relief door 600 (referred to herein as the door 600) constructed in accordance with the teachings of this disclosure. FIG. 6A shows the door 600 in a closed position and FIG. 6B shows the door 600 in an open position. The door 600 is rotatably coupled to the panel 506 via an example hinge 602 along an example first edge 604 of the door 600. In some examples, the first edge 604 is a forward-most edge of the door 600. The hinge 602 enables the door 600 to rotate with respect to the panel 506 between the closed position and the open position. For example, the door 600 rotates in a forward direction about the hinge 602 to move from the closed position to the open position. The panel 506 includes an opening 606 that is substantially the same size and shape as the door 600. In this example, the door 600 and the opening 606 are square. In other examples, the door 600 and the opening 606 can be a different shape. In other examples, the opening 606 can be smaller than the door 600, and the door 600 can be outside of the panel 506 and overlap a portion of the panel 506. In this example, the panel 506 forms part of the leading edge slat 206A of FIG. 5 such that the panel 506 at least partially defines the first compartment 502 of the leading edge slat 206A. The door 600 has an example outer surface 607 facing outward from the first compartment 502. In some examples, the panel 506 and the door 600 can be constructed of the same or different materials.

Turning to FIG. 6A, when the door 600 is in the closed position, the door 600 is substantially flush or aligned with the panel 506. In the closed position, the door 600 covers or blocks the opening 606 (FIG. 6B) such that heated bleed air is prevented from escaping the first compartment 502 via the opening 606. While the door 600 is in the closed position, the heated bleed air is supplied to the first compartment 502 via the WAI system 300 of FIG. 3A to raise a temperature inside the first compartment 502 and reduce formation of ice on the panel 506. In some examples, a seal is provided around the door 600 and/or within the opening 606, such that when the door 600 is in the closed position, the seal substantially fills any gaps between the door 600 and the panel 506.

Turning to FIG. 6B, the door 600 can move from the closed position to the open position by rotating about the hinge 602. While the door 600 is in the open position, the door 600 uncovers the opening 606 such that the heated bleed air can be vented from the first compartment 502 to the atmosphere (e.g., as shown by the arrows in FIG. 6B). For example, the heated bleed air can be vented to reduce the temperature inside the first compartment 502 during failure of the WAI system 300. Additionally or alternatively, the door 600 can be opened while the aircraft 100 of FIG. 1 is grounded.

Figure 7:
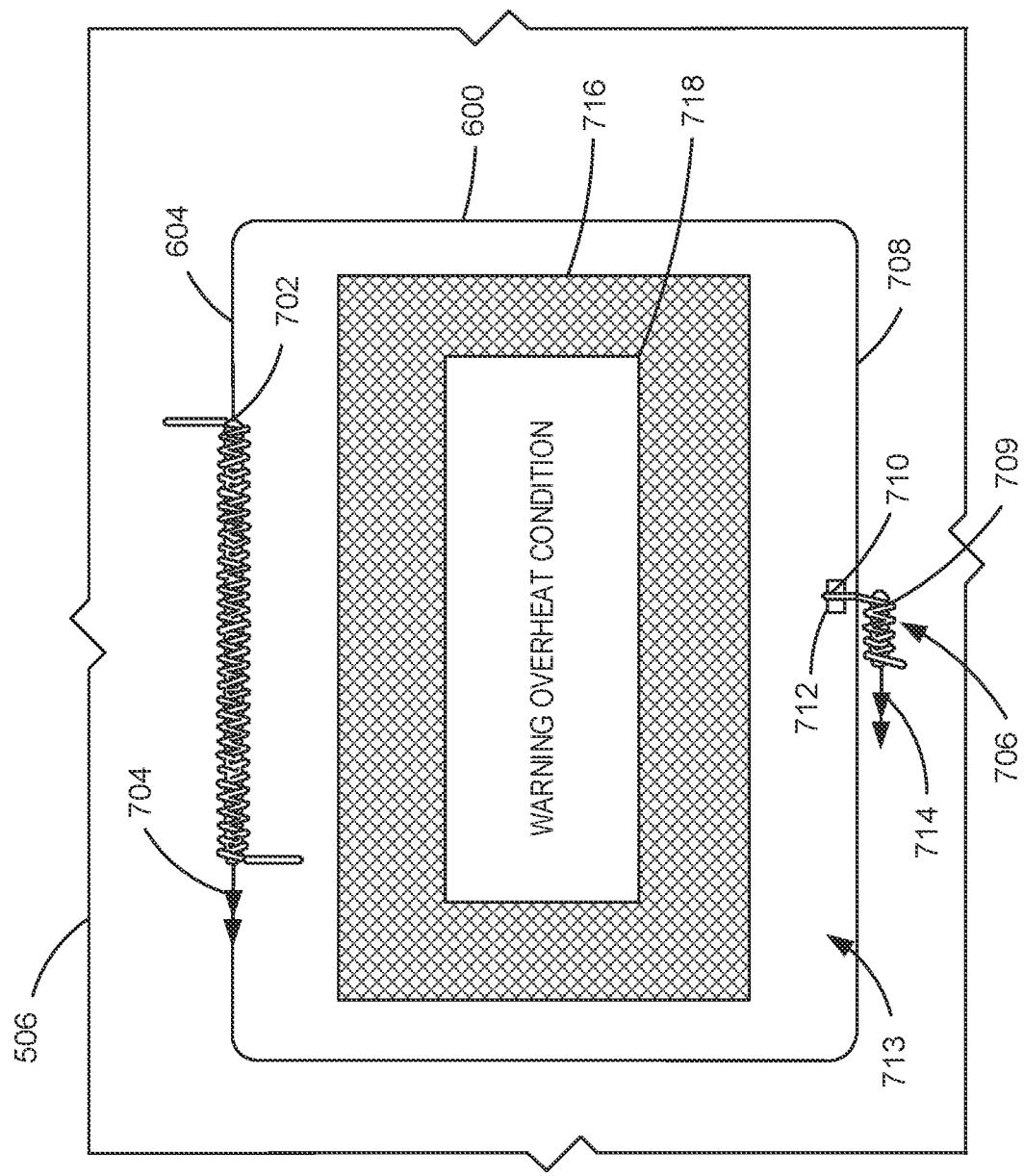
FIG. 7 shows an inner surface of the example thermal relief door of FIGS. 6A and 6B.

FIG. 7 shows the door 600 of FIGS. 6A and 6B from inside the first compartment 502 of FIG. 5. In FIG. 7, the door 600 is in the closed position. In the illustrated example of FIG. 7, the door 600 is disposed in the opening 606 of the panel 506. In the illustrated example, a first torsion spring 702 is coupled between (e.g., coupled to) the panel 506 and the door 600 along the first edge 604. In some examples, the first torsion spring 702 is formed with the hinge 602 of the door 600. The first torsion spring 702 generates a first torsional force on the door 600. In this example, an example first torsion axis 704 of the first torsion spring 702 is oriented leftward in FIG. 7, such that the first torsional force acts inward on the door 600. Accordingly, the first torsion spring 702 biases the door 600 to the closed position under normal operating conditions of the WAI system 300. In some examples, one or more stops may be provided on the panel 506 and/or the door 600 to prevent the door 600 from rotating inward into the first compartment 502 (FIG. 5). While in this example a torsion spring is used, other types of springs can additionally or alternatively be used.

As shown in the illustrated example of FIG. 7, an example latch 706 is coupled to the panel 506. The latch 706 is used to hold the door 600 in the closed position. In the illustrated example, the latch 706 is disposed proximate an example second edge 708 of the door 600, where the second edge 708 is opposite the first edge 604. In this example, the latch 706 includes a second torsion spring 709 with a latch hook 710. The second torsion spring 709 is coupled to the panel 506. A pin 712 is coupled to an inner surface 713 of the door 600 adjacent to the second edge 708. The latch hook 710 is at least partially wrapped around the pin 712. In this example, an example second torsion axis 714 of the second torsion spring 709 is oriented leftward in FIG. 7, such that a second torsional force generated by the second torsion spring 709 causes the latch hook 710 to engage and hold the pin 712 (and, thus, the door 600). As such, while the latch hook 710 is engaged with and/or at least partially wrapped around the pin 712, the latch 706 prevents the door 600 from moving (e.g., rotating) relative to the panel 506, thereby holding the door 600 in the closed position.

In the illustrated example of FIG. 7, the first and second torsion spring elements 702, 709 are constructed from thermally-sensitive materials (e.g., aluminum). A thermally-sensitive material is a material, such as a metal, that has reduced stiffness and/or rigidity above a threshold temperature. Different thermally-sensitive materials may have different threshold temperatures. In some examples, the first and second torsion springs 702, 709 are constructed of the same type of thermally-sensitive material (e.g. aluminum). In other examples, the first and second torsion springs 702, 709 are constructed of different types of thermally-sensitive materials. When the WAI system 300 (FIG. 3) is operating normally, the temperature within the first compartment 502 (FIG. 5) is maintained below the threshold temperature. As such, the first and second torsion springs 702, 709 remain stiff and hold the door 600 in the closed position. However, if the WAI system 300 fails to shut off and the temperature inside the first compartment 502 rises above the threshold temperature (e.g., above 400 degrees Fahrenheit), the stiffness and/or rigidity of the first and second torsion springs 702, 709 is reduced. In such examples, in response to the stiffness and/or rigidity being reduced, the second torsion spring 709 releases the latch hook 710 from the pin 712. Furthermore, in response to the stiffness and/or rigidity being reduced, a weight of the door 600 overcomes the first torsional force of the first torsion spring 702 such that the door 600 can open. When the door 600 is open, bleed air from the first compartment 502 is vented to the atmosphere, which reduces the temperature inside the first compartment 502 and prevents overheating (e.g., caused by malfunction and/or failure of the WAI system 300).

In this example, both the first torsion spring 702 and the latch 706 are implemented to keep the door 600 in the closed position under normal operating conditions, and open the door 600 under overheating conditions. However, in other examples, only one of the first torsion spring 702 or the latch 706 may be implemented. In such an instance, the door 600 may still function substantially the same as disclosed in connection with both the first torsion spring 702 and the latch 706.

In the illustrated example of FIG. 7, the door 600 includes an example visual indicator 716 on the inner surface 713 of the door 600. When the door 600 is closed, the visual indicator 716 is not visible from outside the aircraft 100. However, when the door 600 is open, the visual indicator 716 is visible from outside of the aircraft, such as by a person standing below the first wing 104. Accordingly, ground crew of the aircraft 100 can determine whether overheating has occurred based on whether the visual indicator 716 is visible. In some examples, the visual indicator 716 is a color different from a color of the panel 506. For example, the visual indicator 716 can be a brightly colored paint (e.g., green, red, yellow, neon, etc.) that is easily viewed at a distance from the door 600. In some examples, one or more different colors (e.g., red, yellow, blue, green, etc.) and/or combination of colors may be used for the visual indicator 716. In this example, the visual indicator 716 includes a crosshatch pattern. In other examples, a different pattern for the visual indicator 716 may be used (e.g., striped, checkerboard, etc.). In the illustrated example, the visual indicator 716 includes an example written message 718 which reads "WARNING OVERHEAT CONDITION." In other examples, the written message 718 can include a different message and/or can include instructions for the operator. In other examples, the written message 718 is not included on the visual indicator 716. In the illustrated example of FIG. 7, when the operator determines that the visual indicator 716 is visible and an overheating condition has occurred, the ground crew can shut off and/or repair the WAI system 300 to prevent further overheating.

In some examples, after the WAI system 300 is shut down and the temperature in the first compartment 502 reduces, the stiffness returns to the first and second torsion springs 702, 709. As such, the first torsion spring 702 moves the door 600 back to the closed position, and latch hook 710 re-engages the pin 712. Additionally or alternatively, the ground crew can manually move the door 600 to the closed position. For example, the ground crew can close the door 600 after restoring proper functionality of the WAI system 300. In other examples, the door 600 can be closed via electrical actuation from a control center (e.g., located within the fuselage 102 of FIG. 1). Alternatively, the door 600 can remain open while the aircraft 100 is grounded and/or during takeoff of the aircraft 100. Then, when the aircraft 100 takes off, the air flow over the leading edge slat 206A generates a force on the door 600 that moves the door 600 to the closed position in a passive manner (e.g., without actuation or intervention by the ground crew). In some such examples, the air flow reduces the temperature and, thus, increase the stiffness of the first and second torsion springs 702, 709 such that the first and second torsion springs 702, 709 can once again hold the door 600 in the closed position during flight of the aircraft 100.

Figures 8A, 8B, 8C:
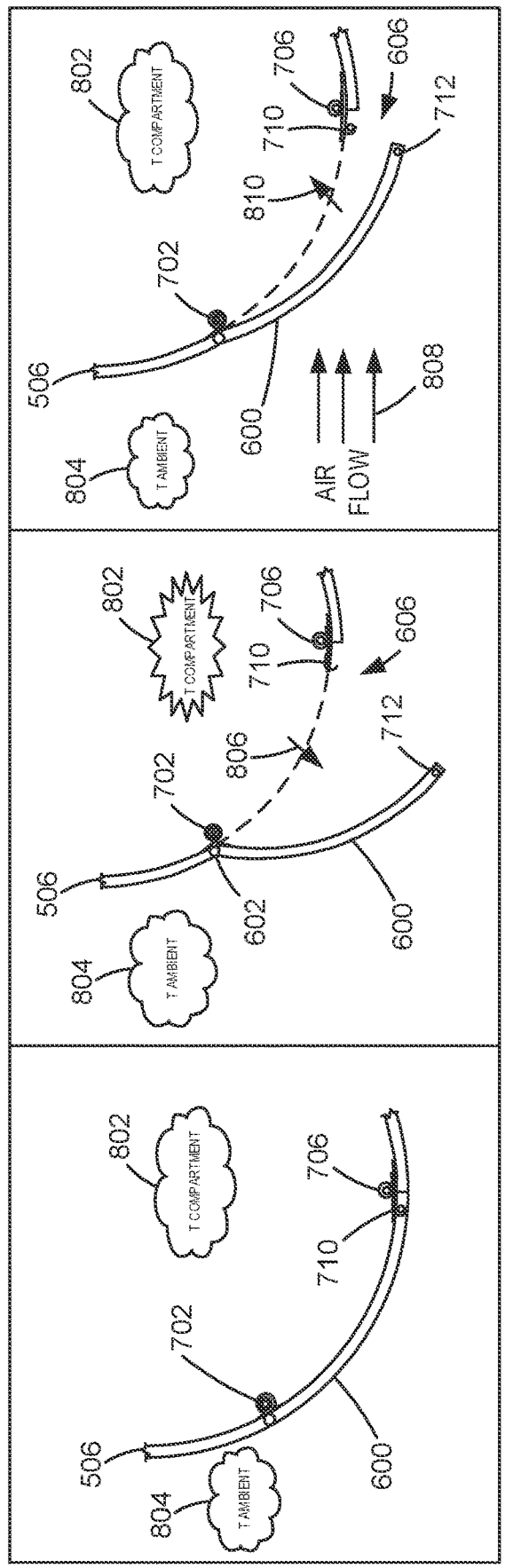
FIG. 8A is a side view of the example thermal relief door of FIGS. 6A, 6B, and 7 in a closed position during normal operating conditions.
FIG. 8B is a side view of the example thermal relief door of FIGS. 6A, 6B, and 7 in an open position to prevent overheating.
FIG. 8C is a side view of the example thermal relief door of FIGS. 6A, 6B, and 7 in a partially closed position during forward propulsion of the example aircraft of FIG. 1.

FIGS. 8A-8C are side views of the door 600 of FIG. 7 under normal operating conditions, under overheating conditions, and during takeoff of the aircraft 100 of FIG. 1, respectively. In the illustrated examples of FIGS. 8A-8C, the door 600 is implemented within the opening 606 of the example panel 506. An example compartment temperature 802 corresponds to a temperature inside the first compartment 502 of FIG. 5. In other examples, the compartment temperature 802 can correspond to a temperature inside the second compartment 504 of FIG. 5.

Turning to FIG. 8A, the WAI system 300 of FIG. 3A is operating under normal conditions to raise the compartment temperature 802 using heated bleed air from an engine (e.g., the first engine 108 and/or the second engine 110) of the aircraft 100. In such examples, the compartment temperature 802 is above an example ambient temperature 804 and below a threshold temperature (e.g., 400 degrees Fahrenheit). In the illustrated example of FIG. 8A, a stiffness of the first and second torsion springs 702, 709 is such that the first and second torsion springs 702, 709 hold the door 600 in the closed position so that the heated bleed air in the first compartment 502 does not escape via the opening 606. In such examples, the heated bleed air inside the first compartment 502 prevents formation of ice on the panel 506.

Turning to FIG. 8B, the door 600 is shown after overheating has occurred in the first compartment 502. In some examples, the overheating can occur while the aircraft 100 is grounded and the WAI system 300 is providing heated bleed air to the first compartment 502. In such examples, the heated bleed air can raise the compartment temperature 802 to at or above the threshold temperature. When the compartment temperature 802 is at or above the threshold temperature, the stiffness of the first and second torsion springs 702, 709 is reduced. As such, a reduced torsional force of the second torsion spring 709 enables the latch hook 710 to release from the pin 712 coupled to the door 600. Furthermore, weight of the door 600 overcomes the reduced torsional force of the first torsion spring 702 such that the door 600 moves to the open position in an example first direction 806 by rotating about the hinge 602. While the door 600 is in the open position, heated bleed air from the first compartment 502 is vented to the atmosphere via the opening 606. Accordingly, discharge of the heated bleed air reduces the compartment temperature 802 to prevent further overheating of the leading edge slat 206A.

Turning to FIG. 8C, the door 600 is shown during takeoff and/or forward propulsion of the aircraft 100. During takeoff and/or forward propulsion of the aircraft 100, an example air flow 808 is generated opposite a direction of motion of the aircraft 100. In such examples, the air flow 808 generates a pressure on the door 600 that causes the door 600 to move in an example second direction 810. In some examples, the air flow 808 causes the door 600 to return to the closed position (e.g., shown in FIG. 8A). In the illustrated example of FIG. 8C, the stiffness of the first and second torsion springs 702, 709 is increased due to the reduction of the compartment temperature 802 to below the threshold temperature. In some examples, when the door 600 returns to the closed position, the latch hook 710 is recoupled to the pin 712, and the first and second torsion springs 702, 709 hold the door 600 in the closed position. Advantageously, the door 600 can be closed without manual intervention by the operator.

While the example door 600 is described in connection with the leading edge slat 206A, the example door 600 can be similarly implemented in connection with anti-ice systems used on other movable high lift devices along the leading edge of the wing, such as droop panels and Krueger flaps. Further, the example door 600 can be implemented on a wing without leading edge slats or other movable devices. For example, the door 600 can be implemented on a fixed portion of the wing that has a compartment for receiving heated air that warms the fixed leading edge of the wing. Further, the door 600 can be implemented in connection with other leading edge surfaces of the aircraft 100. For example, the example door 600 can be used on any of the surfaces of the empennage 112 (FIG. 1) that have anti-ice systems. For example, the door 600 can be implemented on the horizontal stabilizers 114, 116 and/or the vertical stabilizer 118.

As another example, the thermal relief door can be similarly implemented in connection with the inlet cowl 208 of FIG. 2. For example, the inlet cowl 208 may include a panel similar to that the panel 506 that at least partially defines a compartment within the inlet cowl 208 configured to receive the heated bleed air from the EAI system 312 of FIG. 3B. In such examples, the door 600 in the closed position prevents the heated bleed air from escaping the compartment under normal operating conditions of the EAI system 312. Furthermore, the door 600 enables the heated bleed air to escape via an opening to prevent overheating of the inlet cowl 208.

While examples disclosed herein implement a thermal relief door on an aircraft, the thermal relief doors may be implemented in connection with any closed compartment to control a temperature therein. For example, the example thermal relief doors can be implemented on other vehicles, such as cars, trains, etc. that may have a heated compartment. The example thermal relief doors disclosed herein can also be implemented in non-vehicular environments, such in a house or a building.

Figure 9:
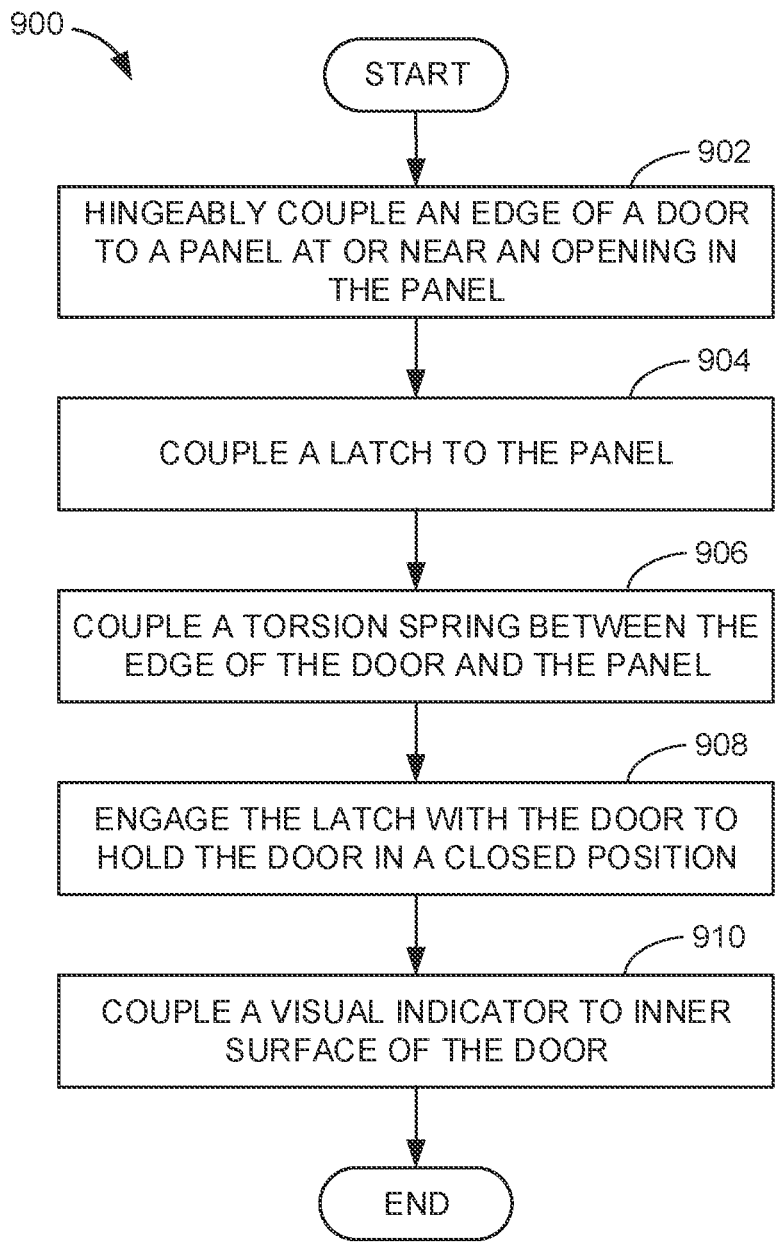
FIG. 9 is a flowchart representative of an example method of installing an example thermal relief door in connection with a heated compartment.

FIG. 9 is a flowchart representative of an example method 900 of installing an example thermal relief door. Any of the example blocks of FIG. 9 can be repeated, combined, removed, and/or rearranged. The example method 900 is disclosed in connection with the example door 600 being installed on the panel 506 of the aircraft 100. However, it is understood that the example method 900 could be similarly performed in connection with other panels for other heated compartments (e.g., on a car, on a building, etc.).

At block 902, the method 900 includes hingeably coupling an edge (e.g., the first edge 604) of the door 600 to the panel 506 at or near the opening 606 in the panel 506 such that the door 600 is moveable between a closed position and an open position. For example, as shown in FIGS. 6A and 6B, the first edge 604 is hingeably coupled to the panel 506 via the hinge 602, and is moveable between the closed position (FIG. 6A) and the open position (FIG. 6B). The panel 506 at least partially defines the first compartment 502 that receives heated air.

At block 904, the method 900 includes coupling the latch 706 to the panel 506. In some examples, the latch 706 is disposed adjacent the second edge 708 of the door 600.

At block 906, the method 900 includes coupling the first torsion spring 702 between the edge (e.g., the first edge 604) of the door 600 and the panel 506. The first torsion spring 702 biases the door 600 to the closed position. In some examples, the first torsion spring 702 is constructed of a thermally sensitive material.

At block 908, the method 900 includes engaging the latch 706 with the door 600 to hold the door 600 in the closed position. In some examples, the latch 706 includes the second torsion spring 709 with the latch hook 710. In some examples, engaging the latch 706 with the door 600 (block 908) includes coupling the pin 712 to the door 600, and at least partially wrapping the latch hook 710 around the pin.

At block 910, the method 900 includes the visual indicator 716 is coupled to the inner surface 713 of the door 600. In this example, the inner surface 713 faces toward the first compartment 502. For example, the visual indicator 716 may be a sticker that is applied to the inner surface 713 of the door 600.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that prevent overheating of anti-ice systems on an aircraft. The disclosed methods, apparatus and articles of manufacture improve the efficiency of the anti-ice systems by implementing a thermal relief door that enables venting of bleed air in response to a compartment of the aircraft reaching a critical (threshold) temperature, thus preventing damage of one or more components of the aircraft.

Example 1 includes an aircraft including a wing, a slat movably coupled to the wing, the slat having a compartment to receive heated bleed air, the slat including a panel, an opening formed in the panel, a door in the opening of the panel of the slat, an edge of the door hingeably coupled to the panel, the door movable between a closed position and an open position, and a latch coupled to the panel, the latch to hold the door in the closed position, the latch constructed of a thermally sensitive material such that when a temperature inside of the compartment reaches a threshold temperature, the latch releases the door to enable the door to move to the open position to vent the heated bleed air from the compartment.

Example 2 includes the aircraft of Example 1, further including a torsion spring coupled between the edge of the door and the panel. The torsion spring is to bias the door to the closed position.

Example 3 includes the aircraft of Example 2, wherein the torsion spring is constructed of a thermally sensitive material such that when the temperature inside of the compartment reaches the threshold temperature, a stiffness of the torsion spring reduces to enable the door to rotate to the open position.

Example 4 includes the aircraft of any of Examples 1-3, wherein the edge is a first edge, and wherein the latch is disposed adjacent a second edge of the door opposite the first edge.

Example 5 includes the aircraft of any of Examples 1-4, wherein the edge is a forward-most edge of the door, such that when the door moves from the closed position to the open position, the door rotates in a forward direction.

Example 6 includes the aircraft of any of Examples 1-5, wherein the latch includes a torsion spring with a latch hook.

Example 7 includes the aircraft of Example 6, further including a pin coupled to the door. The latch hook at least partially wrapped around the pin when the door is in the closed position.

Example 8 includes the aircraft of any of Examples 1-7, wherein the door has an outer surface facing outward and an inner surface facing toward the compartment. The inner surface has a visual indicator.

Example 9 includes the aircraft of Example 8, wherein the visual indicator includes at least one of a bright color, a pattern, a written warning, or instructions.

Example 10 includes a method of installing a thermal relief door on an aircraft. The method includes hingeably coupling an edge of a door to a panel at or near an opening in the panel such that the door is movable between a closed position and an open position. The panel at least partially defines a compartment. The compartment is to receive heated air. The method also includes coupling a latch to the panel and engaging the latch with the door to hold the door in the closed position. The latch is constructed of a thermally sensitive material such that when a temperature inside of the compartment reaches a threshold temperature, the latch releases the door to enable the door to move to the open position to vent the heated air from the compartment.

Example 11 includes the method of Example 10, wherein the latch includes a torsion spring with a latch hook.

Example 12 includes the method of Example 11, wherein the engaging of the latch with the door includes coupling a pin to the door and at least partially wrapping the latch hook around the pin.

Example 13 includes the method of any of Examples 10-12, further including coupling a torsion spring between the edge of the door and the panel. The torsion spring is to bias the door to the closed position.

Example 14 includes the method of Example 13, wherein the torsion spring is constructed of a thermally sensitive material such that when the temperature inside of the compartment reaches the threshold temperature, a stiffness of the torsion spring reduces to enable the door to rotate to the open position.

Example 15 includes the method of any of Examples 10-14, further including coupling a visual indicator on an inner surface of the door. The inner surface faces toward the compartment. The visual indicator includes at least one of a bright color, a pattern, a written warning, or instructions.

Example 16 includes a system for controlling temperature in a closed compartment. The system includes a panel having an opening. The panel at least partially defines the closed compartment. The closed compartment is to receive heated air. The system also includes a door in the opening of the panel. An edge of the door is rotatably coupled to the panel at a hinge. The door is rotatable between a closed position in which the door covers the opening and an open position in which the door uncovers the opening. The system also includes a torsion spring coupled between the edge of the door and the panel. The torsion spring to bias the door to the closed position. The torsion spring is constructed from a thermally sensitive material. The torsion spring is to reduce stiffness when a temperature inside of the closed compartment reaches a threshold temperature to enable the door to rotate to the open position to vent the heated air from the closed compartment.

Example 17 includes the system of Example 16, wherein the panel is a leading edge panel on an aircraft.

Example 18 includes the system of Example 16, wherein the panel is a leading edge panel on a moveable slat on the aircraft.

Example 19 includes the system of Example 16, wherein the panel is a leading edge panel on an inlet cowl of an engine of an aircraft.

Example 20 includes the system of any of Examples 16-19, wherein the door has an outer surface facing outward and an inner surface facing toward the compartment. The inner surface has a visual indicator.

Example 21 includes an aircraft including a wing having a compartment proximate a leading edge of the wing, the compartment to receive heated bleed air, the wing having an opening formed in a panel to vent the heated bleed air from the compartment to the atmosphere, a door, a first edge of the door coupled to the panel at a hinge, the door rotatable between a closed position in which the door covers the opening and an open position in which the door uncovers the opening, a first torsion spring coupled between the first edge of the door and the panel, and a second torsion spring coupled to the panel, the second torsion spring releasably coupled to a pin on the door, the first and second torsion springs to hold the door in the closed position when a temperature inside the compartment is below a threshold temperature, the first and second torsion springs to reduce stiffness when the temperature inside the compartment is at or above the threshold temperature to enable the door to rotate to the open position to vent the heated bleed air from the compartment.

Example 22 includes the aircraft of Example 21, wherein the pin is disposed adjacent a second edge of the door opposite the first edge.

Example 23 includes the aircraft of Examples 21 or 22, further including an anti-ice system to provide the heated bleed air to the compartment from an engine of the aircraft. The heated bleed air to increase the temperature inside the compartment.

Example 24 includes the aircraft of any of Examples 21-23, wherein the second torsion spring has a latch hook. The latch hook at least partially wrapped around the pin when the door is in the closed position.

Example 25 includes the aircraft of any of Examples 21-24, wherein the first edge is a forward-most edge of the door, such that when the door moves from the closed position to the open position, the door rotates in a forward direction.

Example 26 includes the aircraft of any of Examples 21-25, wherein the door has a first side facing outward and a second side facing toward the compartment. The second side has a visual indicator.

Example 27 includes the aircraft of Example 26, wherein the visual indicator includes at least one of a bright color, a pattern, a written warning, or instructions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
   a wing;
   a slat movably coupled to the wing, the slat having a compartment to receive heated bleed air, the slat including a panel, an opening formed in the panel;
   a door in the opening of the panel of the slat, an edge of the door hingeably coupled to the panel, the door to move from a closed position to an open position and to return from the open position to the closed position;
   a pin coupled to the door; and
   a latch coupled to the panel, the latch to hold the door in the closed position, the latch constructed of a thermally sensitive material such that when a temperature inside of the compartment reaches a threshold temperature, the latch releases the door to enable the door to move to the open position to vent the heated bleed air from the compartment, the latch including a torsion spring with a latch hook, the latch hook at least partially wrapped around the pin when the door is in the closed position, the latch hook to re-engage the pin when the temperature inside of the compartment falls below the threshold temperature and the door returns from the open position to the closed position.

2. The aircraft of claim 1, wherein the torsion spring is a first torsion spring, the aircraft further including a second torsion spring coupled between the edge of the door and the panel, the second torsion spring to bias the door to the closed position.

3. The aircraft of claim 2, wherein the second torsion spring is constructed of a thermally sensitive material such that when the temperature inside of the compartment reaches the threshold temperature, a stiffness of the second torsion spring reduces to enable the door to rotate to the open position.

4. The aircraft of claim 1, wherein the edge is a first edge, and where the latch is disposed adjacent a second edge of the door opposite the first edge.

5. The aircraft of claim 1, wherein the edge is a forward-most edge of the door, such that when the door moves from the closed position to the open position, the door rotates in a forward direction.

6. The aircraft of claim 1, wherein the door has an outer surface facing outward and an inner surface facing toward the compartment, the inner surface having a visual indicator.

7. The aircraft of claim 6, wherein the visual indicator includes at least one of a bright color, a pattern, a written warning, or instructions.

8. A method of installing a thermal relief door on an aircraft, the method comprising:
   hingeably coupling an edge of a door to a panel of a slat at or near an opening in the panel such that the door is movable from a closed position to an open position and returnable from the open position to the closed position, the slat movably coupled to a wing of the aircraft, the panel at least partially defining a compartment in the slat, the compartment to receive heated air;
   coupling a pin to the door;
   coupling a latch to the panel, the latch including a torsion spring with a latch hook; and at least partially wrapping the latch hook around the pin to engage the latch with the door to hold the door in the closed position, the latch constructed of a thermally sensitive material such that when a temperature inside of the compartment reaches a threshold temperature, the latch releases the door to enable the door to move to the open position to vent the heated air from the compartment, the latch hook re-engages with the pin when the temperature falls below the threshold temperature and the door returns from the open position to the closed position.

9. The method of claim 8, wherein the torsion spring is a first torsion spring, the method further including coupling a second torsion spring between the edge of the door and the panel, the second torsion spring to bias the door to the closed position.

10. The method of claim 9, wherein the second torsion spring is constructed of a thermally sensitive material such that when the temperature inside of the compartment reaches the threshold temperature, a stiffness of the second torsion spring reduces to enable the door to rotate to the open position.

11. The method of claim 8, further including coupling a visual indicator on an inner surface of the door, the inner surface facing toward the compartment, the visual indicator including at least one of a bright color, a pattern, a written warning, or instructions.

12. The method of claim 8, wherein the edge is a first edge, and where the latch is disposed adjacent a second edge of the door opposite the first edge.

13. The method of claim 8, wherein the edge is a forward-most edge of the door, such that when the door moves from the closed position to the open position, the door rotates in a forward direction.

14. A system for controlling temperature in a closed compartment, the system comprising:
a panel on a slat coupled to an aircraft wing, the panel having an opening, the panel at least partially defining the closed compartment in the slat, the closed compartment to receive heated air;
a door in the opening of the panel, a pin coupled to the door, an edge of the door rotatably coupled to the panel at a hinge, the door to rotate from a closed position in which the door covers the opening to an open position in which the door uncovers the opening and to return from the open position to the closed position;
a torsion spring coupled between the edge of the door and the panel, the torsion spring to bias the door to the closed position, the torsion spring constructed from a thermally sensitive material, the torsion spring to reduce stiffness when a temperature inside of the closed compartment reaches a threshold temperature to enable the door to rotate to the open position to vent the heated air from the closed compartment; and
a latch coupled to the panel, the latch including a second torsion spring and a latch hook, the latch to hold the door in the closed position, the latch hook at least partially wrapped around the pin when the door is in the closed position, the latch constructed of a thermally sensitive material such that when the temperature inside of the closed compartment reaches the threshold temperature, the latch releases the door, the latch hook to re-engage the pin when the temperature falls below the threshold temperature and the door returns from the open position to the closed position.

15. The system of claim 14, wherein the panel is a leading edge panel on an aircraft.

16. The system of claim 14, wherein the door has an outer surface facing outward and an inner surface facing toward the compartment, the inner surface having a visual indicator.

17. The system of claim 14, wherein the edge is a forward-most edge of the door, such that when the door moves from the closed position to the open position, the door rotates in a forward direction.

18. The system of claim 14, wherein the edge is a first edge, and where the latch is disposed adjacent a second edge of the door opposite the first edge.

19. The system of claim 16, wherein the visual indicator includes at least one of a bright color, a pattern, a written warning, or instructions.

* * * * *